United States Patent [19]

Beauchet

[11] 3,739,530

[45] June 19, 1973

[54] APPARATUS FOR MACHINING BODIES OF REVOLUTION HAVING A CIRCULAR GENERATRIX

[75] Inventor: Jean Beauchet, Annecy, France

[73] Assignee: Societe Nouvelle De Roulements, Annecy (Haute Savoil), France

[22] Filed: Nov. 18, 1971

[21] Appl. No.: 199,995

Related U.S. Application Data

[62] Division of Ser. No. 872,968, Oct. 31, 1969, Pat. No. 3,664,067.

[30] Foreign Application Priority Data

Nov. 6, 1968 France .............................. 68172174

[52] U.S. Cl. .......... 51/105 R, 51/108 R, 51/134 R, 51/289 R
[51] Int. Cl. ........................... B24b 5/26, B24b 5/32
[58] Field of Search ..................... 51/105 R, 108 R, 51/131, 134 R, 289 R, 289 S

[56] References Cited
UNITED STATES PATENTS 2,586,953  2/1952  Johnson ........................... 51/134 X
2,482,485  9/1949  Hutchinson .......................... 51/134
2,507,334  5/1950  Cramer .......................... 51/289 R X
2,341,825  2/1944  Spicacci ............................ 51/131

*Primary Examiner*—Donald G. Kelly
*Attorney*—Stevens, Davis, Miller & Mosher

[57]  ABSTRACT

The apparatus of this invention comprises a cup-shaped rotary grinding wheel adapted to move in its axial direction and having a sphero-concave working surface, a circular rotary driving cage formed along its outer periphery with radial cavities adapted to receive the workpieces to be machined in a continuous cycle, these workpieces being so disposed as to have a common point of intersection with the axis of rotation of the driving cage, and a rotary track supporting and carrying along the workpieces with a movement of rotation about their axes, the cage revolving concentrically to the track and being adapted to bring the workpieces beneath the working zone of the grinding wheel.

5 Claims, 4 Drawing Figures

APPARATUS FOR MACHINING BODIES OF REVOLUTION HAVING A CIRCULAR GENERATRIX

This is a division of application Ser. No. 872,968, filed Oct. 31, 1969, and now U.S. Pat. No. 3,664,067, issued on May 23, 1972.

The present invention relates to an apparatus for machining by abrasion or grinding bodies of revolution having a circular generatrix.

An apparatus for grinding bodies of revolution having a circular generatrix is already known which utilizes a "Centerless" grinder of conventional design operating according to the "enfilade" or line engagement technique and wherein the working grinding wheel is cut to the desired contour of the workpiece, the workpiece being supported by a fixed bar and driven along the working wheel by a driving drum.

On the other hand, it is known to grind a workpiece by generation along a spherical surface and by using a cup-shaped grinding wheel against which the workpiece is retained while causing this workpiece to revolve about an axis converging towards the wheel axis.

However, in the first apparatus mentioned hereinabove the working or grinding wheel is subjected to wear and distortion, so that cutting operations must be performed periodically to regenerate its contour. Besides, as a rule, grinders constructed according to this method are bulky, complicated and scarcely flexible in operation.

On the other hand, the second apparatus mentioned hereinabove, although permitting of dispensing with the wheel cutting operation, is applicable only to the grinding of spherical surfaces, and furthermore it is not suitable for applying a continuous machining technique.

It is the essential object of the present invention to provide a simpler and more flexible grinding apparatus for obtaining bodies of revolution having a wholly or partially circular generatrix, and combining the advantageous features of known line engagement devices with centerless loading, with those of the generation machining type.

The method employing the apparatus of this invention is characterized essentially in that it consists in disposing and maintaining a series of workpieces in a suitable driving device, and imparting to these workpieces two movements of rotation, one movement being a relative rotation of each workpiece about its axis and the other a rotational movement of all the workpieces together with their driving device about the axis of this device which form a predetermined angle with the axis of rotation of a grinding wheel revolving in the opposite direction with respect to said driving device, the workpieces being fed automatically to said driving device and caused to contact said grinding wheel having a sphere-concave working surface, and discharged automatically upon completion of the continuous working operation.

The apparatus for carrying out the method broadly set forth hereinabove is characterized essentially in that it comprises a cup-shaped rotary grinding wheel adapted to move in its axial direction and having a sphero-concave working surface, a circular rotary driving cage formed along its outer periphery with radial cavities adapted to receive the workpieces to be machined in a continuous cycle, these workpieces being so disposed as to have a common point of intersection with the axis of rotation of said driving cage, and a rotary track supporting and carrying along the workpieces with a movement of rotation about their axes, said cage revolving concentrically to the track and being adapted to bring the workpieces beneath the working zone of the grinding wheel.

Other features and advantages characterizing this invention will appear as the following description proceeds with reference to a preferred form of embodiment of the apparatus of this invention concerning the machining of taper rollers having a circular generatrix and a relatively great radius of curvature, for a taper-roller bearing, this example being given by way of illustration and described with reference to the attached drawing, in which.

Figure 1:
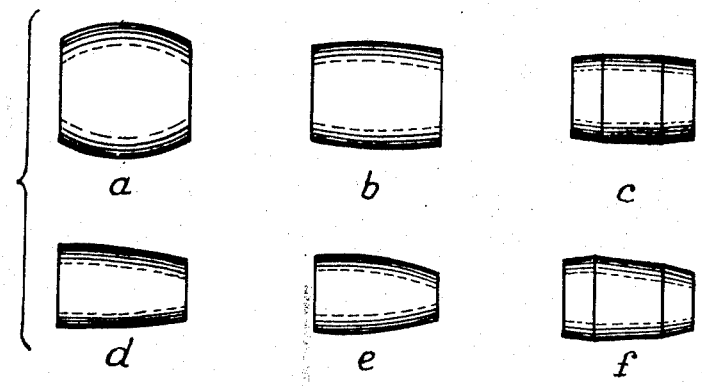
FIG. 1 illustrates a few typical examples of workpieces obtainable by the apparatus of this invention.

FIG. 1 shows by way of example different types of known workpieces obtainable with the apparatus of this invention. Thus, a barrel-shaped workpiece $a$ having a relatively short radius of curvature, a cylindrical roller having a full circular generatrix $b$ or a partial circular generatrix $c$ (bulged or raked roller), a taper roller, also in these two versions $d$ and $f$ respectively, and a strongly asymmetric roller $e$, are shown.

Figure 2:
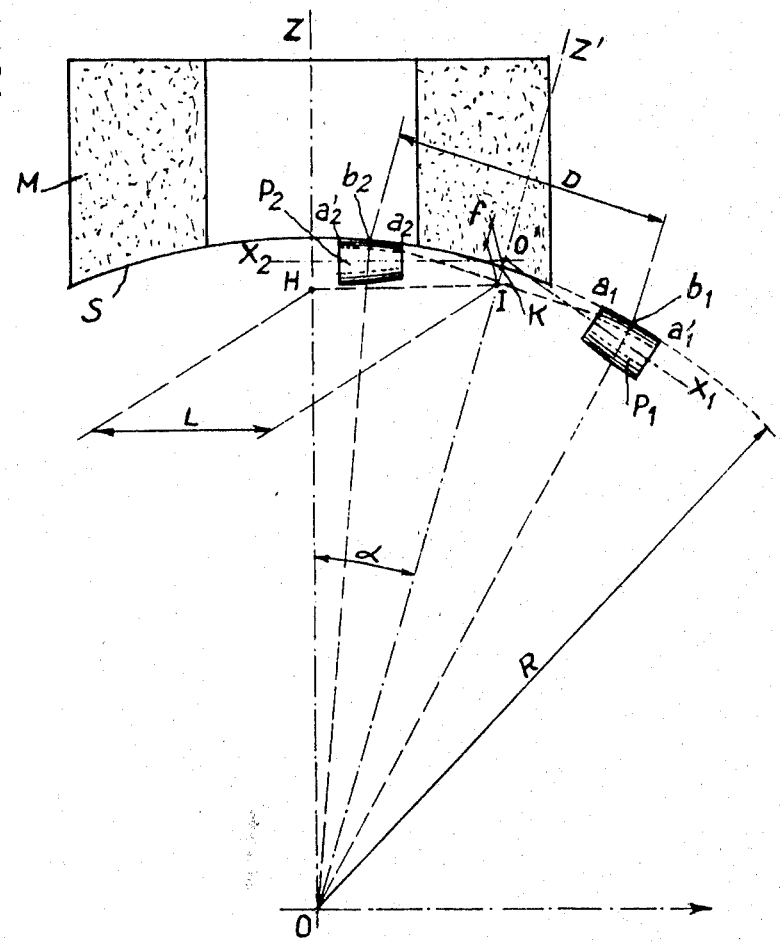
FIG. 2 illustrates diagrammatically the principle of this invention.

FIG. 2 illustrates diagrammatically the basic operating principle of this invention, for example in the case of taper rollers having a circular generatrix having a relatively great radius of curvature ($P_1$, $P_2$); in this case the workpieces are rigid with a plate revolving about an axis $OZ'$ and two movements are imparted thereto: i.e., a movement of relative rotation about their axis $O'X_1$ and $O'X_2$, and a movement for rotatably driving the taper rollers about the axis $OZ'$. Since the workpieces P have a circular generatrix, it will be seen that their outer surface consists of a spherical zone of which the means axis is $OZ'$, a radius of curvature R and a center O. A cup-shaped grinding wheel M revolving about an axis OZ has a working surface S of sphero-concave configuration having likewise a radius R and a center of curvature at O. By revolving about its axis, the wheel remains tangent to the outer surface of the workpieces in the ground on finished condition (it being obvious that the wheel becomes tangent to the workpiece only when the latter has the desired contour).

The plane of the figure is that formed by the axes of rotation OZ of the grinding wheel and $OZ'$ of the plate driving the workpieces P. In this figure: D is the length of chord $b_1 b_2$ ($b_1$ and $b_2$ being the centers of the generatrices $a_1 a'_1$ and $a_2 a'_2$ merging into the spherical envelope of the two workpieces $P_1$ and $P_2$ diametrally opposed in relation to the axis $OZ'$ and having their axes in the plane of the figure);

$f = IK$ is the versed sine of chord $b_1 b_2$ on radius R;

$I$ is the middle point of chord $b_1 b_2$; H is the orthogonal projection of I on the axis OZ of the grinding wheel. Thus, $L = HI$;

$\alpha$ is the angle formed by the axes OZ and OZ'. Thus, the following relationship is obtained:

$$\sin \alpha = HI/OI = L/R - f$$
$$R = Ob_2 = \sqrt{(b_2I)^2 + (OI)^2} = \sqrt{D^2/4 + L^2/\sin^2 \alpha}$$

It will be seen that R is dependent on the following variable parameters: $\sin \alpha$, L and D. It is therefore only necessary to alter one of these variables for modifying the value of R.

Figure 4:
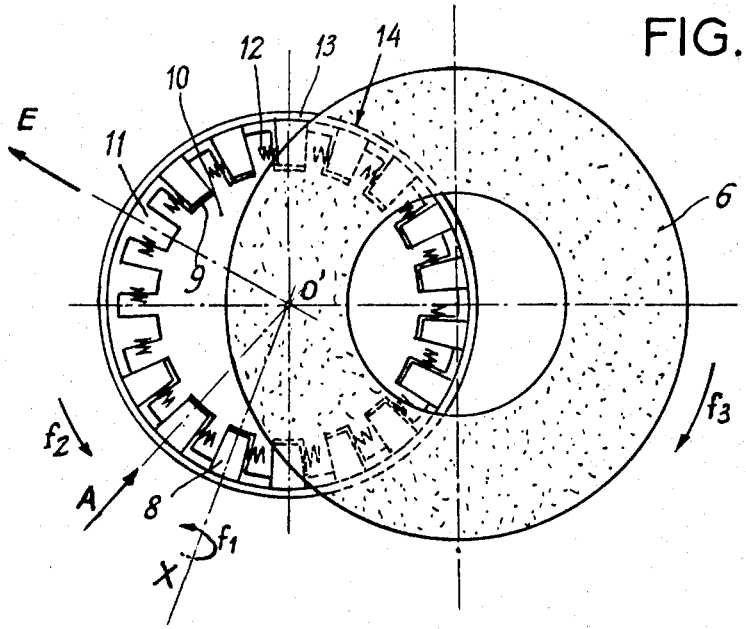
FIG. 4 illustrates on a larger scale a detailed plan view of a driving cage with the workpieces and the grinding wheel of the device shown in FIG. 3.
Figure 3:
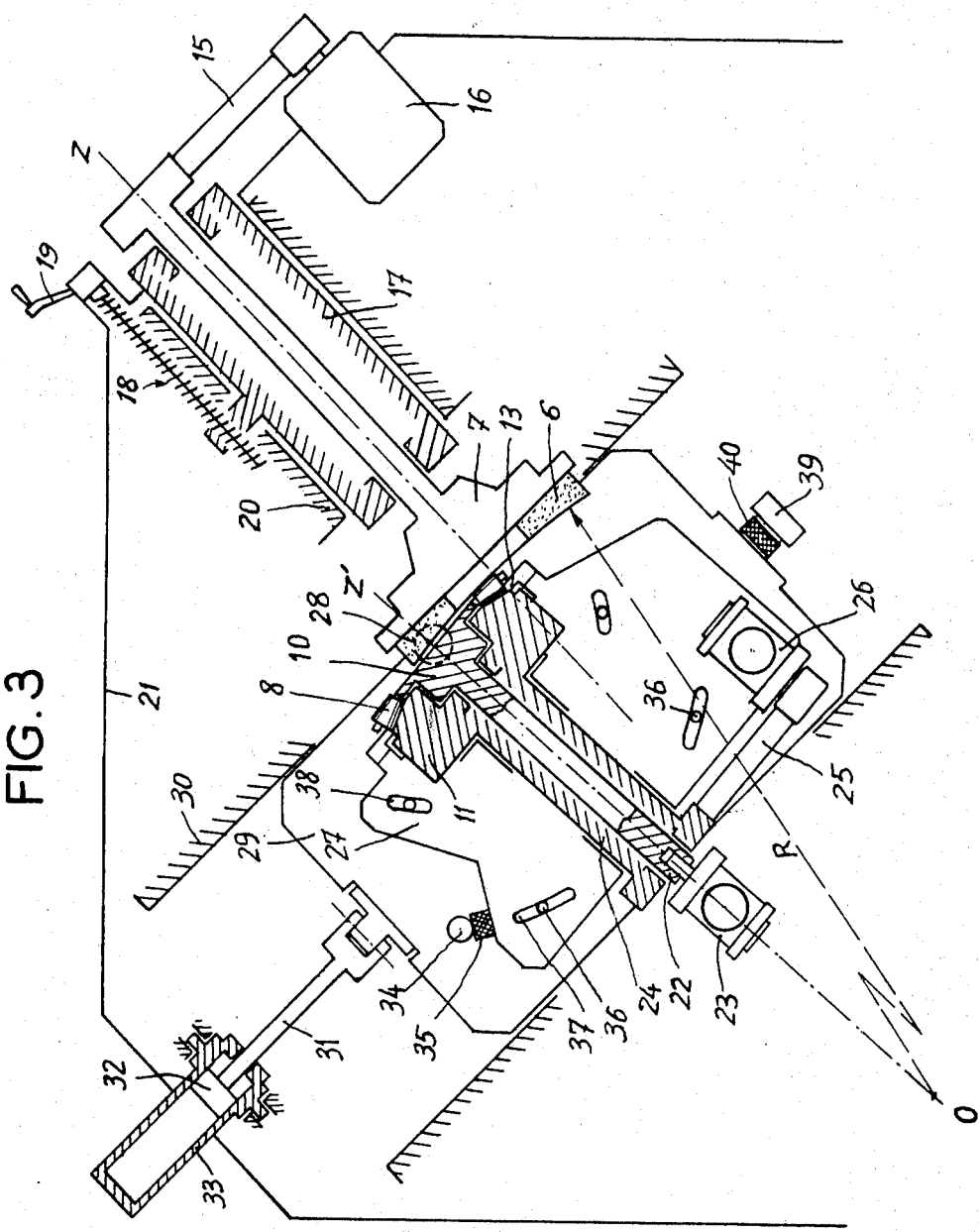
FIG. 3 is a diagrammatic illustration of the apparatus of this invention.

A typical form of embodiment of the apparatus of this invention is illustrated in FIGS. 3 and 4. In this device the workpieces 8 disposed in the cavities 9 of a driving cage 10 are rotatably driven about their axes O'X in the direction $f_1$ by the conjugate action of a track 11 and of said driving cage 10. The track 11 revolves in the direction $f_2$ at a higher speed than the cage 10 revolving in the same direction. The workpieces 8 are held in engagement with the cage 10 by a resilient device 12 (for example a spring or a jet of fluid under pressure) and a front end of the workpieces is held in engagement by the centrifugal force against the lateral inner surface of an axially projecting annular portion forming a collar on the outer periphery 13 of track 11 by the centrifugal force. Thus the workpieces are driven by the cage 10 under the working area 14 of grinding wheel 6 revolving in the direction $f_3$ opposite to $f_2$ (the machining is performed in a single pass). In FIG. 4 the automatic feeding of workpieces 8 is shown only schematically by the arrow A, and the ejection of the ground workpieces is denoted by the arrow E.

The adjustment means and details of this device are shown more particularly in FIG. 3. The assembly comprising the grinding wheel 6 and its support 7 is rotatably driven via a transmission 15 from a motor 16 in a supporting bearing 17. This bearing 17 is adapted, under the control of a screw-and-nut mechanism 18 driven by means of a crank handle 19, or under the control of any other suitable means known per se, to slide longitudinally in slideways 20 rigid with the frame structure 21 of the machine, this movement being also imparted to the assembly comprising the grinding wheel 6 and its carrier member 7. The spindle 22 of the driving cage 10 is rotatably driven from a motor 23 housed within a tubular shaft 24 rigid with track 11 driven in turn via a transmission 25 from a motor 26 housed in supporting block or plate 27. This assembly, i.e., the cage 10, track 11 and supporting block 27 can pivot about a pivot pin 28 rigid with a plate 29 and extending at right angles to the plane containing the axis OZ of grinding wheel 6 and the axis OZ' of cage 10. The aforesaid plate 29 is movable in a transverse plane in slideways 30 rigid with the frame structure 21 of the machine, under the control of the rod 31 of a piston 32 movable in a fluid-actuated cylinder 33, or through any other means producing the same action.

The radius R can be adjusted according to the above-described principle and to the reference symbols of FIG. 2, by performing the following three operations either separately or in combination:

1. The angle $\alpha$ is adjustable by pivoting the supporting bearing 27 about the axis of pivot pin 28 and causing same to engage an abutment 34 of plate 29 by means of a distance-piece 35 having the desired thickness, or by using any other means capable of causing the angle $\alpha$ to be adjusted with a high degree of precision. Then, the supporting bearing 27 is locked to plate 29 by means of tightening members 36 extending through elongated arcuate slots 37, 38 formed in plate 27.

2. The adjustment of L is obtained by actuating the cylinder 33 so as to bring the plate 29 into engagement with an abutment 39 rigid with the frame structure 21 of the machine, a distance-piece or shim 40 of adequate thickness being used to this end.

3. The dimension D, with due consideration for the length of the workpiece to be machined, results from the dimensions of the circular surface 13.

According to the specific nature of the workpieces to be obtained, the track 11 and cage 10 may also be replaced by similar parts of different dimensions.

Having duly completed these preliminary operations, the grinding wheel is cut with the radius R by securing a suitable cutting device (as a rule a diamond tool) to the cage 10, so that the cutting edge or point follows the generatrix to be obtained (for example one of points $b$ of FIG. 2).

In order to operate only in the zone 14 (FIG. 4), a slight clearance is provided by pivoting the axis OZ of the grinding wheel very slightly about the line HI extending at right angles thereto and lying in a plane containing the axis OZ' of cage 10 (see FIG. 2). Thus, the workpiece can move beneath the first zone of the wheel without contacting same.

This method of providing a clearance is well known per se and currently used, for example in face or end-grinding. This step does not alter in any manner the nature and quality of the grinding work.

The grinding wheel wear is compensated by simply reducing the distance from the grinding wheel to the workpiece carrier, and any re-cutting of the wheel can be dispensed with due to the machining "by generation" carried out with the apparatus of this invention.

Of course, this invention should not be construed as being limited by the specific form of embodiment described and illustrated herein, since it also includes any modifications and variations that may occur to those conversant with the art, and is applicable to the machining of workpieces other than those illustrated by way of example in the practical form of embodiment and notably in FIG. 1.

The advantages resulting from the implementation of the present invention consist essentially in obtaining means characterized by extremely flexible conditions of use, whereby bodies of revolution having a circular generatrix can be machined by generation (thus avoiding periodic wheel cutting operations) and as a continuous process.

Besides, the fact that the axes of the grinding wheel and workpiece driving plate are not parallel is attended by an oblique cutting promoting the attenuation of the consequences of spindle defects.

Of course, various modifications and variations may be applied to the specific forms of embodiment of the present invention which is shown and described herein, without departing from the spirit and scope of the invention as defined in the appended claims.

I claim:

1. Apparatus for machining workpieces by abrasion and generation of bodies of revolution having a circular generatrix with centerless loading, comprising: A cup-shaped rotary grinding wheel adapted to move along its axis and having a sphero-concave working surface, a circular rotary driving cage formed along its outer periphery with radial cavities disposed at spaced intervals and adapted to receive the workpieces to be machined continuously, said workpieces being so disposed in said cavities that their axes have a common point of intersection with the axis of rotation of the driving cage, said workpieces being disposed in said cavities such that their side surfaces are brought into contact with said grinding wheel to be ground to a desired shape, and a rotary track supporting said workpieces and driving same with a movement of rotation about their axes, said cage revolving concentrically to said track and bringing the bodies to be generated by the workpieces beneath the working zone of the grinding wheel, the common axis of said track and cage forming an adjustable acute angle with the axis of said grinding wheel and said track and cage rotating in a direction opposite to that of said grinding wheel.

2. Apparatus according to claim 1, wherein said track has an axially projecting annular portion forming a collar on the outer periphery, against the lateral inner surface of which are engaged the workpieces moved in a radial direction in cavities of said cage by centrifugal force.

3. Apparatus for machining workpieces by abrasion and generation of bodies of revolution having a circular generatrix with centerless loading, comprising: a cup-shaped rotary grinding wheel adapted to move along its axis and having a sphero-concave working surface, a circular rotary driving cage formed along its outer periphery with radial cavities disposed at spaced intervals and adapted to receive the workpieces to be machined continuously, said workpieces being so disposed in said cavities that their axes have a common point of intersection with the axis of rotation of the driving cage, and a rotary track supporting said workpieces and driving same with a movement of rotation about their axes, said cage revolving concentrically to said track and bringing the workpieces beneath the working zone of the grinding wheel, the assembly comprising said cage and said track being adapted to pivot about an axis extending at right angles to their common axis of rotation.

4. Apparatus according to claim 3, characterized in that said cage and track assembly is movable transversely to the axis of rotation of the grinding wheel.

5. Apparatus according to claim 3, characterized in that abutment members associated with distance-pieces or shims are provided for limiting the pivotal movements and the movements of translation of said cage and track assembly for adjusting the radius of curvature of the generatrix to be obtained.

* * * * *